(12) United States Patent
Koujima et al.

(10) Patent No.: US 8,479,999 B2
(45) Date of Patent: Jul. 9, 2013

(54) COMPOSITE MAGNETIC ANTENNA AND RF TAG, AND METAL PART AND METAL TOOL ON WHICH THE COMPOSITE MAGNETIC ANTENNA OR RF TAG IS INSTALLED

(75) Inventors: Jun Koujima, Hiroshima-ken (JP);
Tetsuya Kimura, Hiroshima-ken (JP);
Takanori Doi, Hiroshima-ken (JP);
Yoshiro Sato, Tokyo (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 0 days.

(21) Appl. No.: 12/992,197

(22) PCT Filed: May 12, 2009

(86) PCT No.: PCT/JP2009/002060
§ 371 (c)(1),
(2), (4) Date: Jan. 13, 2011

(87) PCT Pub. No.: WO2009/139148
PCT Pub. Date: Nov. 19, 2009

(65) Prior Publication Data
US 2011/0101113 A1 May 5, 2011

(30) Foreign Application Priority Data
May 13, 2008 (JP) .................................. 2008-126504

(51) Int. Cl.
*G06K 19/06* (2006.01)
*G08B 13/14* (2006.01)
(52) U.S. Cl.
USPC ......... 235/492; 343/788; 343/789; 340/572.7
(58) Field of Classification Search
USPC ............. 235/492; 340/572.8, 572.7; 343/895, 343/788–789
See application file for complete search history.

(56) References Cited

U.S. PATENT DOCUMENTS

| 6,486,853 | B2 * | 11/2002 | Yoshinomoto et al. ....... 343/895 |
| 6,956,481 | B1 | 10/2005 | Cole |

(Continued)

FOREIGN PATENT DOCUMENTS

| JP | 2002-521757 | 7/2002 |
| JP | 2003-046321 | 2/2003 |

(Continued)

OTHER PUBLICATIONS

International Search Report for PCT/P2009/002060, mailed Aug. 18, 2009.
Japanese Office Action mailed Sep. 12, 2012 in connection Japanese Patent Application No. 2008-126504, 7 pp.

*Primary Examiner* — Thien M Le
*Assistant Examiner* — Toan Ly
(74) *Attorney, Agent, or Firm* — Nixon & Vanderhye P.C.

(57) ABSTRACT

A composite magnetic antenna for information communication utilizes a magnetic field component as well as a composite RF tag using the composite magnetic antenna, which can be embedded in metals while maintaining a sufficient communication sensitivity unlike conventional RF tags which are unusable in the metal embedding applications. The composite RF tag for transmitting and receiving information using an electromagnetic induction method includes a magnetic antenna on which an IC is mounted, and an insulating material and a metal material or a conductive material which are formed around the magnetic antenna. The magnetic antenna includes a central core formed of a magnetic material, and an electrode material formed into a coil around the central core. The insulating material is formed around the magnetic antenna except for one longitudinal end of the coil of the magnetic antenna. The metal material or the conductive material is formed on an outside of the insulating material.

3 Claims, 3 Drawing Sheets

U.S. PATENT DOCUMENTS

| | | | |
|---|---|---|---|
| 2004/0052034 A1* | 3/2004 | Senba et al. | 361/600 |
| 2005/0156752 A1 | 7/2005 | Finkenzeller et al. | |
| 2006/0022056 A1* | 2/2006 | Sakama et al. | 235/492 |
| 2007/0159336 A1* | 7/2007 | Tethrake et al. | 340/572.8 |
| 2008/0129629 A1* | 6/2008 | Kimura et al. | 343/788 |

FOREIGN PATENT DOCUMENTS

| | | |
|---|---|---|
| JP | 2004-200829 | 7/2004 |
| JP | 2005-518030 | 6/2005 |
| JP | 2007-019891 | 1/2007 |

* cited by examiner

FIG. 1
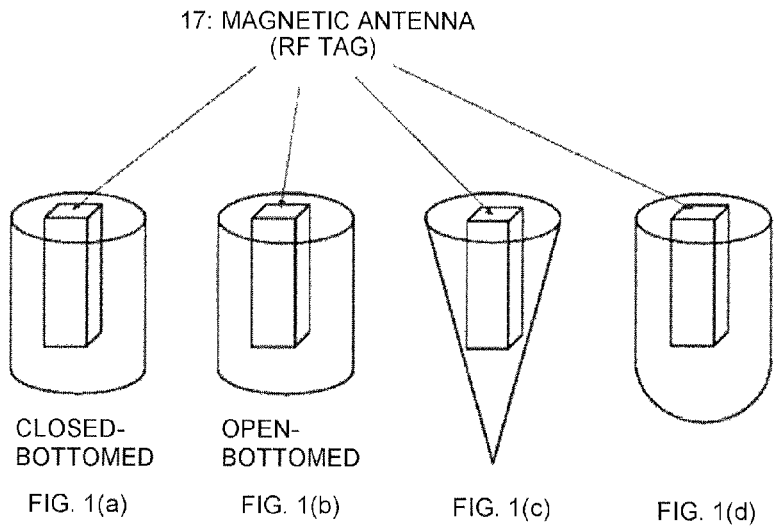
CLOSED-BOTTOMED    OPEN-BOTTOMED
FIG. 1(a)    FIG. 1(b)    FIG. 1(c)    FIG. 1(d)
FIG. 2
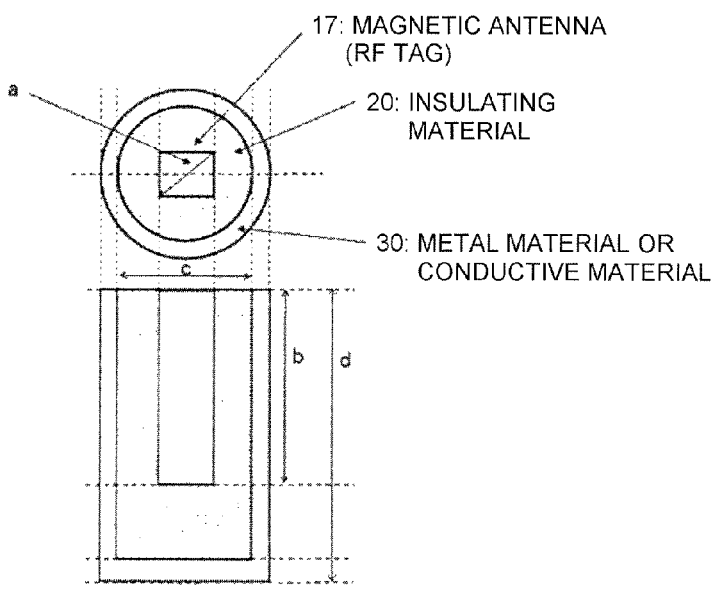

COMPOSITE MAGNETIC ANTENNA AND RF TAG, AND METAL PART AND METAL TOOL ON WHICH THE COMPOSITE MAGNETIC ANTENNA OR RF TAG IS INSTALLED

This application is the U.S. national phase of International Application No. PCT/JP2009/002060, filed May 12, 2009, which designated the U.S. and claims priority to Japanese Patent Application No. 2008-126504, filed May 13, 2008, the entire contents of each of which are hereby incorporated by reference.

TECHNICAL FIELD

The present invention relates to a magnetic antenna for information communication using a magnetic field component and an RF tag using the magnetic antenna. In the present invention, the magnetic antenna is surrounded by a metal material or a conductive material except for one longitudinal end of a coil thereof. As a result, the resulting composite magnetic antenna or RF tag can be embedded in metals while maintaining a sufficient communication sensitivity unlike conventional RF tags which have been unusable in such metal embedding applications.

BACKGROUND ART

An antenna for transmitting and receiving an electromagnetic wave using a magnetic material (hereinafter referred to merely as a "magnetic antenna") includes a coil formed by winding a conductive wire around a core (magnetic material), in which a magnetic field component coming from the outside is allowed to pass through the magnetic material to convert the magnetic field component into a voltage (or current) induced by the coil. Such a magnetic antenna has been widely used in small-size radios and TVs. The magnetic antenna is also used in a non-contact object identification device called RF tag which has recently come into use.

To transmit and receive an electromagnetic wave with a higher frequency, a planar loop antenna free of a magnetic material and including a loop coil having a coil surface parallel to an object to be identified is used in RF tags. When the frequency is much higher (UHF band or microwave band), an electric field antenna (dipole antenna or dielectric antenna) for detecting an electric field component instead of a magnetic field component is widely used in such RF tags.

However, the planar loop antenna and electric field antenna have the following problems. That is, when such an antenna comes close to a metal material, an image (mirror effect) is generated on the metal material. Since the magnetic field of the image has a phase opposite to that of the antenna, the sensitivity of the antenna tends to be lost.

On the other hand, there is also known a magnetic antenna for transmitting and receiving a magnetic field component which comprises a magnetic layer as a central core, a coil-shaped electrode material wound on the core, an insulating layer formed on at least one outside surface of the core on which the coil-shaped electrode material is provided, and a conductive layer formed on at least one outside surface of the insulating layer (Patent Document 1). The magnetic antenna described in Patent Document 1 can maintain properties required for antennas even when coming into contact with a metal material. In addition, tags and magnetic antennas which are installed in specific conditions are conventionally known (Patent Documents 2 to 4).

Patent Document 1: Japanese Patent Application Laid-open (KOKAI) No. 2007-19891
Patent Document 2: Japanese Patent Application Laid-open (KOKAI) No. 2002-207980
Patent Document 3: Japanese Patent Application Laid-open (KOKAI) No. 2004-362342
Patent Document 4: Japanese Patent Application Laid-open (KOKAI) No. 2005-198255

DISCLOSURE OF THE INVENTION

Problem to be Solved by the Invention

In the method described in Patent Document 1, it is suggested to take a certain measure in the case where the antenna is used in the application for attachment to metals in a specific direction. However, when embedded in metal parts or metal tools, the antenna may fail to maintain a sufficient sensitivity.

Also, in the method described in Patent Document 2 which aims at installation of an antenna or tag on a surface of objective products, no consideration is taken to embed the antenna or tag in the objective products.

Further, in the methods described in Patent Documents 3 and 4, an outer peripheral surface of the magnetic antenna is covered and surrounded by a magnetic material. However, these methods aim at improving a sensitivity of the magnetic antenna by covering the magnetic antenna with a ferrite material, and may therefore fail to solve problems concerning adverse influences by metals or conductive materials placed therearound.

Under these circumstances, an object of the present invention is to provide a composite RF tag or a composite magnetic antenna which is small in size and comprises a magnetic antenna which can maintain good properties thereof even when embedded in a small hole formed in metals.

Means for Solving the Problem

The above object of the present invention can be achieved by the following aspects of the present invention.

That is, in accordance with the present invention, there is provided a composite RF tag for transmitting and receiving information using an electromagnetic induction method, comprising a magnetic antenna on which an IC is mounted, and an insulating material and a metal material or a conductive material which are formed around the magnetic antenna, the magnetic antenna comprising a central core formed of a magnetic material, and an electrode material formed into a coil around the central core;

the insulating material being formed around the magnetic antenna except for one longitudinal end of the coil of the magnetic antenna; and the metal material or the conductive material being formed on an outside of the insulating material (Invention 1).

In addition, according to the present invention, there is provided a composite RF tag for transmitting and receiving information using an electromagnetic induction method, comprising a magnetic antenna on which an IC is mounted, and an insulating material and a metal material or a conductive material which are formed around the magnetic antenna, the magnetic antenna comprising a central core formed of a magnetic material and a non-magnetic material, and an electrode material formed into a coil around the central core;

the insulating material being formed around the magnetic antenna except for one longitudinal end of the coil of the magnetic antenna; and the metal material or the conductive material being formed on an outside of the insulating material (Invention 2).

Also, according to the present invention, there is provided the composite RF tag as described in the above Invention 1, wherein the metal material or the conductive material is formed into a circular shape in section and has an inner diameter not less than 1.0 time a maximum length of a section of the magnetic antenna (Invention 3).

Also, according to the present invention, there is provided the composite RF tag as described in the above Invention 1, wherein a length of the metal material or the conductive material in a depth direction thereof is not less than 1.0 time a longitudinal length of the magnetic antenna (Invention 4).

In addition, according to the present invention, there is provided a composite magnetic antenna for transmitting and receiving information using an electromagnetic induction method, comprising a magnetic antenna, and an insulating material and a metal material or a conductive material which are formed around the magnetic antenna, the magnetic antenna comprising a central core formed of a magnetic material or formed of the magnetic material and a non-magnetic material, and an electrode material formed into a coil around the central core;

the insulating material being formed around the magnetic antenna except for one longitudinal end of the coil of the magnetic antenna; and the metal material or the conductive material being formed on an outside of the insulating material (Invention 5).

Further, according to the present invention, there is provided a metal part comprising the composite RF tag as described in any one of the above Inventions 1 to 4 or the composite magnetic antenna as described in the above Invention 5 (Invention 6).

Furthermore, according to the present invention, there is provided a metal tool comprising the composite RF tag as described in any one of the above Inventions 1 to 4 or the composite magnetic antenna as described in the above Invention 5 (Invention 7).

Effect of the Invention

The composite RF tag and the composite magnetic antenna according to the present invention hardly undergo a change in communication sensitivity even when embedded in a small-space hole formed in a metal material, and, therefore, can be suitably used in the applications such as 13.56 MHz RFID.

The composite RF tag and the composite magnetic antenna according to the present invention have a small size and are free from adverse influences from outside, in particular, influences by outside metals or conductive materials, and, therefore, can be suitably used in a state embedded in metals or the like in various applications such as portable equipments, containers, metal parts, boards, metal tools, various metal molds, printing plates or printing rolls, vehicles such as bicycles and automobiles, metal jigs, and markers such as bolts and rivets.

BRIEF DESCRIPTION OF THE DRAWINGS

FIG. 1 is a conceptual view of a composite RF tag according to the present invention.

FIG. 2 is a sectional view of a composite RF tag according to the present invention.

EXPLANATION OF REFERENCE NUMERALS

Figure 3:
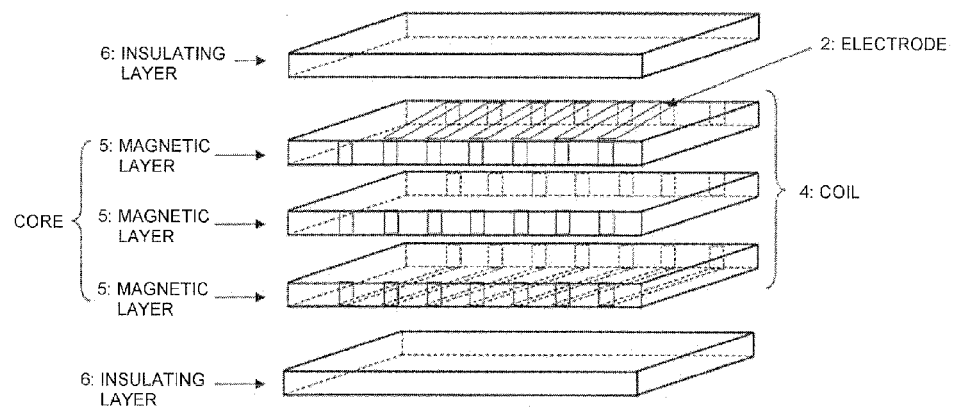
FIG. 3 is a conceptual view of a magnetic antenna according to the present invention.

1: through-hole; 2: electrode pattern (coil electrode); 3: coil open end; 4: coil; 5: magnetic layer; 6:
insulating layer; 7: conductive layer; 8: non-magnetic layer; 17: magnetic antenna; 20: insulating material; 30:
metal material or conductive material; a: maximum diameter of magnetic antenna; c: inner diameter of metal material or conductive material; b: length in longitudinal direction of magnetic antenna; d: length in depth direction of metal material or conductive material

PREFERRED EMBODIMENT FOR CARRYING OUT THE INVENTION

First, the composite RF tag of the present invention is described.

In the composite RF tag according to the present invention, an insulating material is formed around the magnetic antenna (RF tag) on which an IC is mounted, except for one longitudinal end of a coil (opened surface of magnetic flux) of the magnetic antenna. In addition, a metal material or a conductive material is formed on an outside of the insulating material. The magnetic antenna comprises a central core formed of a magnetic material or formed of the magnetic material and a non-magnetic material, and an electrode material formed into a coil around the central core. The magnetic antenna serves as an RF tag by mounting an IC thereon.

In FIGS. 1(a) to 1(d) and FIG. 2, there are shown schematic views of the composite RF tag according to the present invention.

As shown in the figures, the composite RF tag according to the present invention has such a structure that a metal material or a conductive material 30 is disposed around a magnetic antenna 17 to surround a whole peripheral surface of the magnetic antenna except for one longitudinal end of a coil thereof, and further an insulating material 20 is filled in a space between the magnetic antenna and the metal material or the conductive material.

The sectional shape of the metal material or the conductive material as used in the present invention is not particularly limited, and may be any shape including a circular shape, an elliptical shape, a polygonal shape such as a triangular shape, a quadrangular shape, a pentagonal shape and a hexagonal shape, and a star shape. In view of industrial productivity, among these shapes, preferred is the circular shape.

In addition, the sectional shape of the metal material or the conductive material when taken along a longitudinal direction of the coil of the magnetic antenna may be not only a cylindrical shape as shown in FIG. 1(a) but also a open-bottomed cylindrical shape, a conical shape or a bottom-semispherical shape as shown in FIGS. 1(b) to 1(d), respectively.

Meanwhile, it is not required that the metal material or the conductive material is formed over a whole outside surface of the insulating material. The metal material or the conductive material may be formed so as to cover either a whole outside surface of the insulating material or only on a gapped partial surface thereof. Examples of the configuration of the metal material or the conductive material on the insulating material include the configuration where two or more curved metal materials or conductive materials are formed on the insulating material with a clearance therebetween so as not to come into contact with each other, the configuration where two or more plate-shaped metal materials or conductive materials are formed on the insulating material with a clearance therebetween so as not to come into contact with each other, the configuration where the metal material or the conductive material is formed on the insulating material with a partial clearance therebetween, the configuration where the metal material or the conductive material having a C-shaped section is formed on the insulating material having a circular sectional shape, or the configuration where the metal material or the conductive material is formed on each corner of the insulating material having a polygonal sectional shape such as a quadrangular sectional shape. Even when the metal material or the conductive material is formed with a clearance therebetween, only at least one end of the composite RF tag may be wholly covered with the metal material or the conductive material.

In the present invention, when the metal material or the conductive material has a circular sectional shape, the ratio of an inner diameter of the metal material or the conductive material (c in FIG. 2) to a maximum length of a section of the magnetic antenna (a in FIG. 2) (c/a) is required to be not less than 1.0. The ratio c/a is preferably not less than 1.1 and more preferably not less than 1.3.

In addition, the ratio of a length of the metal material or the conductive material in a depth direction thereof (d in FIG. 2) to a length of the core in a longitudinal direction thereof (b in FIG. 2) (d/b) is preferably not less than 1.0. When the ratio d/b is less than 1.0, the resulting composite RF tag tends to hardly exhibit a sufficient sensitivity. The ratio d/b is more preferably not less than 1.2.

Also, the thickness of the metal material or the conductive material is not particularly limited, and is preferably about 0.5 to about 2.0 mm.

The metal material used in the present invention is not particularly limited, and may be a general metal pipe material. Examples of the metal material used in the present invention include stainless steel, iron, aluminum, copper and brass. Examples of the conductive material used in the present invention include a general conductive material such as carbon, a conductive organic material such as polyacetylene, and a composite material thereof.

As the insulating material used in the present invention, there may be used resins, glass ceramic materials and non-magnetic ferrites. Examples of the suitable resins include heat resistant resins such as polyimides, epoxy resins and phenol resins. Examples of the suitable glass ceramic materials include borosilicate-based glass materials and zinc-based or lead-based glass materials. Examples of the suitable non-magnetic ferrites include Zn-based ferrites. The resins, glass ceramics and non-magnetic ferrites may be respectively used in the form of a mixture of any two or more thereof.

In the RF tag according to the present invention, an IC is mounted on the magnetic antenna. On the other hand, the RF tag may be used as an antenna in the case where no IC is mounted on the magnetic antenna. Further, in the composite magnetic antenna, a wiring connected with a lead terminal of the coil of the magnetic antenna may extend up to outside thereof and may be connected to an IC chip disposed outside of the magnetic antenna.

Next, the magnetic antenna used in the present invention is described.

Figure 4:
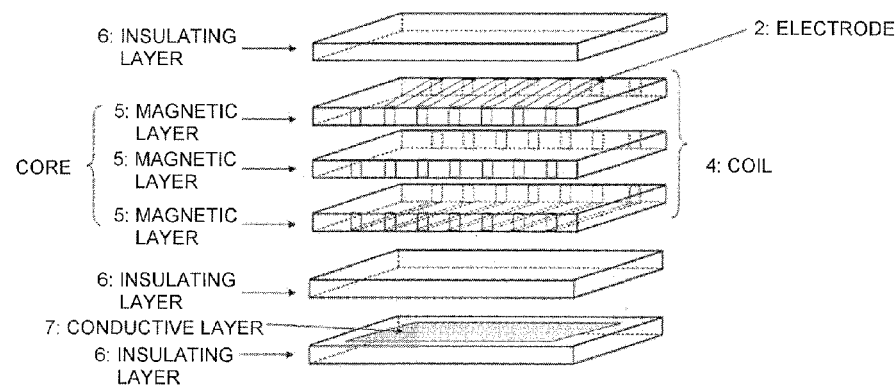
FIG. 4 is a conceptual view of a magnetic antenna according to the present invention.
Figure 5:
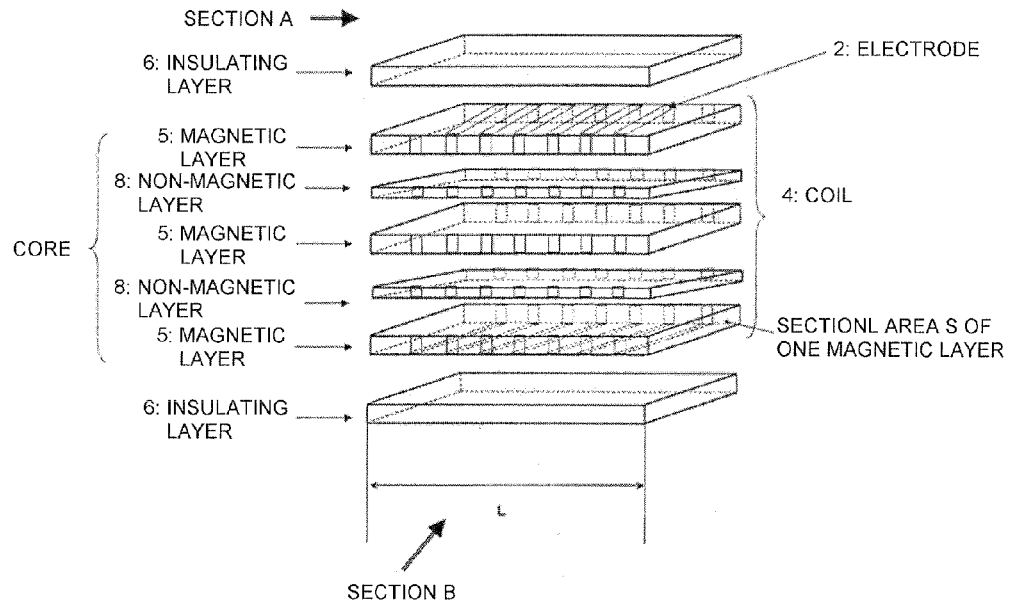
FIG. 5 is a conceptual view of a magnetic antenna according to the present invention.

The magnetic antenna used in the present invention is schematically shown in FIGS. 3 to 5.

The magnetic antenna shown in FIG. 3 has a basic structure which comprises a magnetic layer (core), an electrode material formed into a coil shape (wire winding shape) around the central core, and an insulating layer formed on at least one outside surface of the core on which the coil-shaped electrode material is formed.

Figure 6:
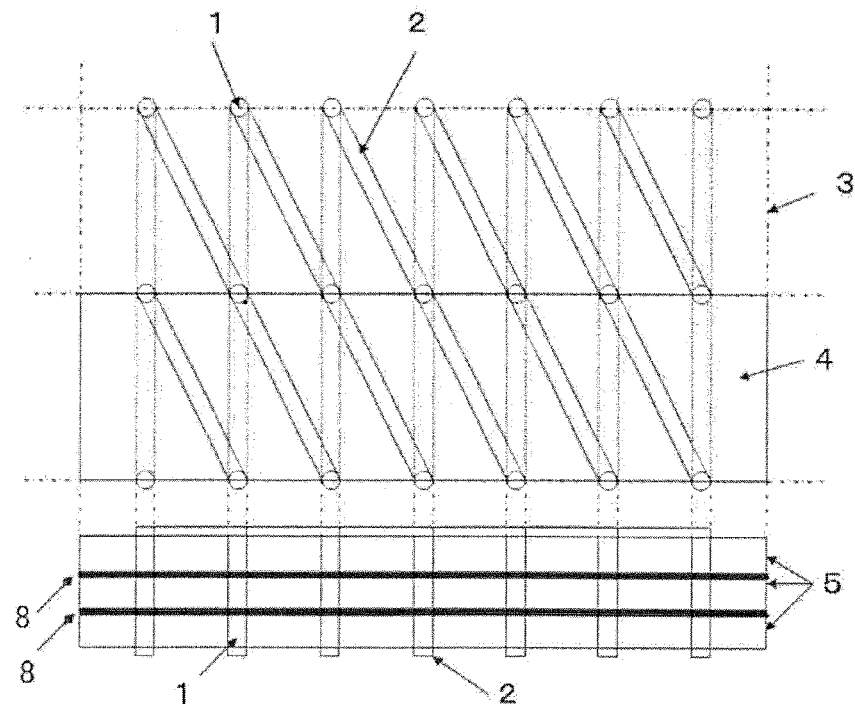
FIG. 6 is a view showing a laminated structure of a coil portion of a magnetic antenna according to the present invention.

In the magnetic antenna of the present invention as shown in FIG. 3, a mixture prepared by mixing magnetic particles and a binder is formed into a sheet shape to form a magnetic layer 5 in the form of a single layer or a laminated layer having a plurality of layers as shown in FIG. 6. Then, through-holes 1 are formed through the thus formed magnetic layer 5. The electrode material is poured into the respective through-holes 1. Also, the electrode material is applied on both surfaces of the magnetic layer which are perpendicular to the through-holes 1, to form an electrode pattern 2 in the form of a coil (wire winding) which is connected with the electrode material poured into the through-holes 1. Thus, the coil is formed around a square or rectangular core constituted from the magnetic layer 5. At this time, the above structure is configured such that both terminal ends of of the magnetic layer 5 forming the coil 4 are open ends of a magnetic circuit.

Next, insulating layers 6 are respectively formed on upper and lower surfaces of the coil 4 on which the electrode pattern is formed.

The thus obtained sheet is cut into a desired shape along the through-holes 1 and the open ends 3 of the coil and then integrally sintered, or is integrally sintered and then cut into a desired shape along the through-holes 1 and the open ends 3 of the coil, thereby producing the magnetic antenna (LTCC technology).

The magnetic antenna shown in FIG. 4 has a basic structure which comprises a magnetic layer (core), an electrode material formed into a coil shape (wire winding shape) around the central core, an insulating layer formed on at least one outside surface of the core on which the coil-shaped electrode material is formed, and a conductive layer formed on at least one outside surface of the insulating layer.

In the magnetic antenna of the present invention as shown in FIG. 4, a mixture prepared by mixing magnetic particles and a binder is formed into a sheet shape to form a magnetic layer 5 in the form of a single layer or a laminated layer having a plurality of layers as shown in FIG. 6. Then, through-holes 1 are formed through the thus formed magnetic layer 5. The electrode material is poured into the respective through-holes 1. Also, the electrode material is applied on both surfaces of the magnetic layer which are perpendicular to the through-holes 1, to form an electrode pattern 2 in the form of a coil (wire winding) which is connected with the electrode material poured into the through-holes 1. Thus, the coil is formed around a square or rectangular core constituted from the magnetic layer 5. At this time, the above structure is configured such that both terminal ends of the magnetic layer 5 forming the coil 4 are open ends of a magnetic circuit.

Next, insulating layers 6 are respectively formed on upper and lower surfaces of the coil 4 on which the electrode pattern is formed.

In addition, a conductive layer 7 is formed on an upper surface (outside surface) of at least one of the insulating layers 6.

The thus obtained sheet is cut into a desired shape along the through-holes 1 and the open ends 3 of the coil and then integrally sintered, or is integrally sintered and then cut into a desired shape along the through-holes 1 and the open ends 3 of the coil, thereby producing the magnetic antenna (LTCC technology).

The magnetic antenna shown in FIG. 5 according to the present invention has a basic structure which comprises a central core formed of a magnetic material 5 and a non-magnetic material 8, an electrode material formed into a coil shape (wire winding shape) outside of the central core, an insulating layer formed on at least one outside surface of the central core on which the coil-shaped electrode material is formed. The core has such a structure in which the magnetic material is divided into plural parts by the non-magnetic material.

Meanwhile, in the magnetic antenna as shown in FIG. 5, when viewed in section of the core, the area ratio of all portions of the magnetic material to all portions of the non-magnetic material (all portions of the magnetic material/all portions of the non-magnetic material) is preferably not more than 1.0. When the area ratio of the portions formed of the non-magnetic material exceeds the above-specified range, the proportion of the magnetic material in the core is reduced, which tends to be disadvantageous for achieving reduction in size of the magnetic antenna. The area ratio of all portions of the magnetic material to all portions of the non-magnetic material in the core is more preferably not more than 0.5, and still more preferably not more than 0.2.

Meanwhile, in the magnetic antenna as shown in FIG. 5, the ratio of a sectional area (S) of one of the magnetic layers forming the core of the magnetic antenna as shown in FIG. 5 to a length (L) of the magnetic antenna (S/L) is preferably not more than 0.3. When the area ratio (S/L) is more than 0.3, it may be difficult to reduce adverse influences owing to a demagnetizing field.

In the present invention, the magnetic antenna having such a core as shown in FIG. 5 may be produced, for example, by the following method.

First, a mixture prepared by mixing magnetic particles and a binder is formed into a sheet shape to form a magnetic layer in the form of a single layer or a laminated layer having a plurality of layers.

Separately, a mixture prepared by mixing non-magnetic particles and a binder is formed into a sheet shape to form a non-magnetic layer in the form of a single layer or a laminated layer having a plurality of layers.

Next, as shown in FIG. 6, the magnetic layers 5 and the non-magnetic layers 8 are alternately laminated to obtain a laminate having a desired total thickness.

Then, a desired number of through-holes 1 are formed through the thus obtained laminate comprising the magnetic layers and the non-magnetic layers. The electrode material is poured into the respective through-holes. Also, the electrode material is applied on both surfaces of the laminate which are perpendicular to the through-holes, to form an electrode pattern 2 in the form of a coil (wire winding) which is connected with the electrode material poured into the through-holes. The electrode material poured into the through-holes and the electrode pattern cooperate with each other to form a coil having a square or rectangular core constituted from the magnetic layers. At this time, the above structure is configured such that both terminal ends of the magnetic layers constituting the coil are open ends of a magnetic circuit (refer to numeral 3 in FIG. 6).

Next, insulating layers 6 are respectively formed on upper and lower surfaces of the coil on which the electrode pattern is formed, as shown in FIG. 5.

The thus obtained sheet is cut into a desired shape along the through-holes and the open ends of the coil and then integrally sintered, or is integrally sintered and then cut into a desired shape along the through-holes and the open ends of the coil, thereby producing the magnetic antenna (LTCC technology).

In the magnetic antenna of the present invention, as the magnetic material of the core, there may be used Ni—Zn-based ferrite, etc. The Ni—Zn-based ferrite used in the present invention preferably has a composition comprising 45 to 49.5 mol % of $Fe_2O_3$, 9.0 to 45.0 mol % of NiO, 0.5 to 35.0 mol % of ZnO and 4.5 to 15.0 mol % of CuO. The ferrite composition may be suitably selected such that the resulting core as the magnetic material thereof has a high magnetic permeability and a low magnetic loss in a frequency band to be used. When using a material having an excessively high magnetic permeability as the magnetic material, the resulting core tends to undergo an increased magnetic loss and as a result, tends to be unsuitable for antennas.

For example, the ferrite composition is preferably selected such that the core has a magnetic permeability of 70 to 120 at 13.56 MHz when the magnetic antenna is applied to an RFID tag, and has a magnetic permeability of 10 to 30 at 100 MHz when the magnetic antenna is used to receive commercial FM broadcasts, because the magnetic loss can be reduced.

Also, in the magnetic antenna of the present invention, a coil lead terminal and an IC chip connecting terminal both formed of the electrode material may be formed on an outside surface of the insulating layer to connect an IC therewith.

The magnetic antenna provided therein with the above IC chip connecting terminal may be produced as follows. That is, though-holes 1 are formed through the insulating layer 6 disposed on at least one surface of the coil 4 on which the electrode pattern is formed. The electrode material is poured into the through-holes 1, and connected with both ends of the coil 4. Thus, the coil lead terminal and the IC chip connecting terminal both formed of the electrode material is formed on the surface of the insulating layer, and the thus produced structure is then integrally sintered to produce the magnetic antenna.

In addition, in the magnetic antenna of the present invention, a capacitor electrode may be disposed on the outside surface of the insulating layer. Further, an additional insulating layer may be provided on the outside surface on which the capacitor electrode is disposed.

Also, the magnetic antenna of the present invention may have a parallel electrode or an interdigital electrode printed on the outside surface of the insulating layer to form a capacitor. In addition, the capacitor may be connected in parallel or in series to the coil lead terminal.

Further, in the magnetic antenna of the present invention, the insulating layer may be further provided on the outside surface where the capacitor electrode is disposed, with an additional insulting layer. In addition, an electrode which also serves as an IC chip connecting terminal may be further formed on an outside surface of the additional insulating layer such that the insulating layer is sandwiched therebetween, to form a capacitor which may be connected in parallel or in series to the IC chip terminal.

In addition, in the magnetic antenna of the present invention, the insulating layer may be provided on the outside surface with a terminal structure to which an IC chip can be connected, so as to connect the IC chip connecting terminal and the coil lead terminal in parallel or in series to each other.

Also, in the magnetic antenna of the present invention, the insulating layer may be provided on the outside surface with a terminal for providing a variable capacitor, so as to connect the coil lead terminals in parallel or in series to each other.

In the magnetic antenna of the present invention, as the magnetic material of the core, there may be used Ni—Zn-based ferrite, etc. The Ni—Zn-based ferrite used in the present invention preferably has a composition comprising 45 to 49.5 mol % of $Fe_2O_3$, 9.0 to 45.0 mol % of NiO, 0.5 to 35.0 mol % of ZnO and 4.5 to 15.0 mol % of CuO. The ferrite composition may be suitably selected such that the resulting core as the magnetic material thereof has a high magnetic permeability and a low magnetic loss in a frequency band to be used. When using a material having an excessively high magnetic permeability as the magnetic material, the resulting core tends to undergo an increased magnetic loss and as a result, tends to be unsuitable for antennas.

For example, the ferrite composition is preferably selected such that the core has a magnetic permeability of 70 to 120 at 13.56 MHz when the magnetic antenna is applied to an RFID tag, and has a magnetic permeability of 10 to 30 at 100 MHz when the magnetic antenna is used to receive commercial FM broadcasts, because the magnetic loss can be reduced.

In the magnetic antenna of the present invention, as the non-magnetic material of the core, there may be used non-magnetic ferrites such as Zn-based ferrites, glass-based ceramic materials such as borosilicate glass, zinc-based glass and lead-based glass, or mixtures obtained by mixing the non-magnetic ferrite and the glass-based ceramic material at an adequate mixing ratio.

The ferrite powder used as the non-magnetic ferrite may be selected so as to have such a Zn-based ferrite composition that a sintered body of the ferrite powder has a volume resistivity of not less than $10^8$ Ω·cm. The Zn-based ferrite composition preferably comprises 45 to 49.5 mol % of $Fe_2O_3$, 17.0 to 22.0 mol % of ZnO and 4.5 to 15.0 mol % of CuO.

The glass-based ceramic powder used as the glass-based ceramic material may be selected so as to have such a composition that its linear expansion coefficient is not largely different from that of the magnetic material used. More specifically, the composition is preferably selected such that the difference in linear expansion coefficient between the glass-based ceramic powder and a soft magnetic ferrite used as the magnetic material lies within the range of ±5 ppm/° C.

Next, the process for producing the composite RF tag according to the present invention is described.

The composite RF tag of the present invention may be produced by disposing a conductive material or a metal material around the above IC-mounted magnetic antenna obtained by the above method so as to surround an outer peripheral portion of the magnetic antenna except for one longitudinal end thereof, and filling a resin into a gap between the magnetic antenna and the conductive material or the metal material. Alternatively, the magnetic antenna may be dipped in the resin to coat the magnetic antenna therewith, followed by drying the resulting resin coat, and then a metal or conductive paste may be applied on the surface of the thus dried resin coat.

The composite RF tag of the present invention may be embedded in a recessed portion with a desired shape which is formed in metal parts, metal tools, etc. In this case, the objectives such as metal parts and metal tools to which the antenna or tag is to be installed, may be previously formed with the recessed portion with a desired shape.

Meanwhile, the composite RF tag of the present invention is preferably installed to the metal pars or metal tools such that the longitudinal direction of the coil thereof (opened surface of magnetic flux) is perpendicular to a reader therefor.
<Function>

The magnetic antenna of the present invention is formed such that an outer peripheral portion thereof is surrounded by the metal material or the conductive material. Therefore, when the magnetic antenna is embedded in metal objectives, it is possible to minimize adverse influences on a communication sensitivity thereof owing to change in environmental conditions without variation of properties such as resonance frequency.

EXAMPLES

In the followings, the present invention is described in more detail on the basis of preferred embodiments thereof by referring to the accompanying drawings.

RF Tag 1

In order to form a magnetic layer, 100 parts by weight of calcined Ni—Zn—Cu ferrite particles which had been found to be a material having a magnetic permeability of 100 as measured at 13.56 MHz after sintering at 900° C. ($Fe_2O_3$: 48.5 mol %; NiO: 25 mol %; ZnO: 16 mol %; CuO: 10.5 mol %), 8 parts by weight of a butyral resin, 5 parts by weight of a plasticizer, and 80 parts by weight of a solvent were mixed in a ball mill to prepare a slurry. The resulting slurry was applied on a PET film with a size of 150 mm×150 mm by a doctor blade such that the thickness of the coating layer obtained upon sintering was 0.1 mm, thereby obtaining a sheet.

In order to form a non-magnetic layer, 100 parts by weight of a borosilicate glass ($SiO_2$: 86 to 89% by weight; $B_2O_3$: 7 to 10% by weight; $K_2O$: 0.5 to 7% by weight), 8 parts by weight of a butyral resin, 5 parts by weight of a plasticizer, and 80 parts by weight of a solvent were mixed in a ball mill to prepare a slurry. The resulting slurry was applied on a PET film with a size of 150 mm×150 mm by a doctor blade such that the thickness of the coating layer obtained upon sintering was 0.05 mm, thereby obtaining a sheet.

Also, an insulating layer was formed in the same manner as defined above. That is, 100 parts by weight of calcined Zn—Cu ferrite particles ($Fe_2O_3$: 48.5 mol %; ZnO: 41 mol %; CuO: 10.5 mol %), 8 parts by weight of a butyral resin, 5 parts by weight of a plasticizer, and 80 parts by weight of a solvent were mixed in a ball mill to prepare a slurry. The resulting slurry was applied on a PET film with the same size and thickness as those for the magnetic layer using a doctor blade, thereby obtaining a sheet.

Next, as shown in FIG. 6, through-holes 1 were formed through the green sheet for the magnetic layer, and filled with an Ag paste. In addition, an Ag paste was printed on both surfaces of the sheet which were perpendicular to the through-holes 1. The ten sheets thus prepared above were laminated on one another to form a coil.

Next, as shown in FIG. 5, the green sheets for the insulating layer were laminated on upper and lower surfaces of the coil 4.

The thus laminated green sheets were bonded together while applying a pressure thereto. The resulting laminate was cut along the through-holes and the coil open ends 3, and integrally sintered at 900° C. for 2 hr, thereby obtaining a magnetic antenna 1 with a size of 10 mm in width×3 mm in length having a coil winding number of 23 turns (in the figures, the coil is shown as having a smaller number of turns for the sake of simplicity, and the magnetic layers laminated are also shown as being formed of only three layers for the sake of simplicity, which also applies to the following other figures).

Further, an IC for an RF tag was connected to both ends of the coil of the magnetic antenna, and a capacitor was connected in parallel to the IC. Then, the resonance frequency was adjusted to 13.56 MHz under the condition that the resulting magnetic antenna was surrounded by a metal material or a conductive material, thereby obtaining an RF tag.

The thus obtained RF tag was enclosed in a metal (stainless steel) tube having an outer diameter of 6 mm, an inner diameter of 5 mm and a length of 15 mm such that one end of the magnetic antenna was aligned with a periphery of the metal tube and centers of the magnetic antenna and the metal tube were positioned concentrically to each other. Then, an epoxy resin was filled in a clearance formed between the RF tag and the metal tube, and the other open end of the metal tube was closed with a lid formed of a metal (stainless steel) plate to produce a composite RF tag.

At this time, the ratio of the inner diameter of the metal tube (c in FIG. 2) to the maximum length of a section of the magnetic antenna (a in FIG. 2) (c/a) was 1.4, and the ratio of the length in a depth direction of the metal tube (d in FIG. 2) to the length in a longitudinal direction of the magnetic antenna (b in FIG. 2) (d/b) was 1.5.

The thus obtained composite RF tag was installed into a recess having an inner diameter of 6 mm and a depth of 15 mm which was opened in an SUS block having a height of 5 cm and a section of 5 cm square to conduct the following measurements before and after the installation.

[Methods for Measuring and Adjusting Resonance Frequency]

The resonance frequency was determined from a peak frequency of an impedance as measured using an impedance analyzer "4291A" manufactured by Agilent Technology Co., Ltd.

[Method for Measuring Communication Distance]

The communication distance was measured by the following method. That is, a tip end of an antenna of a pen-type reader/writer (product name "TR3-PA001/TR3-M001B" manufactured by Takaya Co., Ltd.) which underwent a relatively less influence from external metal materials, was oriented to one end of the thus prepared RF tag which was uncovered with the metal material or the conductive material, and the RF tag was placed at the position as remote from the antenna as possible within the range in which communication therebetween was still possible at 13.56 MHz, and the distance between the antenna and the RF tag was determined as the communication distance.

RF Tag 2

Comparative Example

An IC was mounted on the magnetic antenna produced in the same manner as defined in antenna 1. The resonance frequency of the IC—mounted magnetic antenna was adjusted as such to 13.56 MHz, thereby producing an RF tag. The thus obtained RF tag was coated with an epoxy resin such that the obtained composite RF tag was able to be installed in the above SUS block in the same manner as defined above to evaluate properties thereof.

TABLE 1

| Example and Comparative Example | Communication distance | | Resonance frequency | |
|---|---|---|---|---|
| | Before embedded in metal block (mm) | After embedded in metal block (mm) | Before embedded in metal block (MHz) | After embedded in metal block (MHz) |
| Antenna 1 | 7.0 | 7.0 | 13.6 | 13.6 |
| Antenna 2 (Comparative Example) | 10.0 | communication not possible | 13.6 | 16.2 |

As shown in Table 1, when the composite RF tag uncovered with the metal material was embedded in the metal material, the communication with the reader was not possible.

The invention claimed is:

1. A composite RF tag for transmitting and receiving information using an electromagnetic induction method, comprising a magnetic antenna on which an IC is mounted, and an insulating material and a metal material or a conductive material which are formed around the magnetic antenna, the magnetic antenna comprising a central core formed of a magnetic material, and an electrode material formed into a coil around the central core;

the insulating material being formed around the magnetic antenna except for one longitudinal end of the coil of the magnetic antenna; and the metal material or the conductive material being formed on an outside of the insulating material, wherein the RF tag is configured for transmitting and receiving the information at 13.56 MHz, and wherein the metal material or the conductive material is formed into a circular shape in section and has an inner diameter not less than 1.0 time a maximum length of a section of the magnetic antenna.

2. A composite RF tag according to claim 1, wherein a length of the metal material or the conductive material in a depth direction thereof is not less than 1.0 time a longitudinal length of the magnetic antenna.

3. A composite RF tag according to claim 1, wherein the central core has a magnetic permeability of 70 to 120.

* * * * *